Sept. 13, 1932.

J. T. SHIMMIN
APPARATUS FOR SEPARATING SOLIDS FROM LIQUIDS OR LIQUORS BY FILTRATION
Original Filed Sept. 14, 1925 6 Sheets-Sheet 1

Re. 18,598

INVENTOR.
John T. Shimmin
BY Arthur P. Knight
ATTORNEY.

Sept. 13, 1932.

J. T. SHIMMIN
APPARATUS FOR SEPARATING SOLIDS FROM LIQUIDS OR LIQUORS BY FILTRATION
Original Filed Sept. 14, 1925

Re. 18,598

6 Sheets-Sheet 2

INVENTOR.
John T. Shimmin
BY Arthur P. Knight
ATTORNEY.

Sept. 13, 1932. J. T. SHIMMIN
APPARATUS FOR SEPARATING SOLIDS FROM LIQUIDS OR LIQUORS BY FILTRATION
Original Filed Sept. 14, 1925 6 Sheets-Sheet 3

Re. 18,598

INVENTOR.
John T. Shimmin
BY Arthur P. Knight
ATTORNEY.

Sept. 13, 1932.

J. T. SHIMMIN
APPARATUS FOR SEPARATING SOLIDS FROM LIQUIDS OR LIQUORS BY FILTRATION
Original Filed Sept. 14, 1925 6 Sheets-Sheet 4

Re. 18,598

INVENTOR.
John T. Shimmin
BY
Arthur P. Knight
ATTORNEY.

INVENTOR.
John T. Shimmin
BY Arthur P. Knight
ATTORNEY.

Sept. 13, 1932.

J. T. SHIMMIN
APPARATUS FOR SEPARATING SOLIDS FROM LIQUIDS OR LIQUORS BY FILTRATION
Original Filed Sept. 14, 1925 6 Sheets-Sheet 6

Re. 18,598

INVENTOR.
John T. Shimmin
BY
Arthur P. Knight
ATTORNEY.

Reissued Sept. 13, 1932

Re. 18,598

UNITED STATES PATENT OFFICE

JOHN T. SHIMMIN, OF TONOPAH, NEVADA, ASSIGNOR TO THE DORR COMPANY, INC., OF NEW YORK, N. Y., A CORPORATION OF DELAWARE

APPARATUS FOR SEPARATING SOLIDS FROM LIQUIDS OR LIQUORS BY FILTRATION

Original No. 1,791,251, dated February 3, 1931, Serial No. 56,156, filed September 14, 1925. Renewed October 20, 1930. Application for reissue filed April 17, 1931. Serial No. 530,960.

My invention relates to an apparatus for separating solids from liquid or liquors by filtration, and particularly to a type of vacuum filter. In this type of apparatus a pulp or sludge containing liquid and solids is located in a suitable container, while cells, panels or leaves covered with a filtering medium are brought into contact with the pulp and vacuum applied to them. This causes the liquid or liquor to pass through the filtering medium while the solids are retained thereon. The cell, panel, or leaf is removed from the pulp after a time and the solids removed by any suitable means. The operation is continuous, as a number of cells, panels or leaves are used, one following the other, and each in turn is brought into contact with the pulp and connected to a source of vacuum and subsequently removed from the pulp and cleaned.

The invention in its preferred form comprises a rotary filter shell drum or carrier provided with an interior filtering medium, the liquid or pulp to be filtered being supplied within said shell and above and in contact with said filtering medium so as to cause solids to settle from the liquid onto the filtering medium, the liquid passing through the filtering medium by the action of vacuum apparatus; and the main object of my invention is to provide a filter of this type possessing certain advantageous features of construction and operation, whereby the filtering operation may be carried out rapidly, effectively, and economically. Certain features or aspects of the invention may, however, be applied with advantage in connection with other types of filtering apparatus, as hereinafter described.

An important object of my invention is to provide an apparatus whereby the separation of solids from a liquid may be performed in such an apparatus in the most advantageous manner, as will be hereinafter more fully described, and particularly to provide a continuous filter in which the action of gravity is caused to precede the action of the vacuum in the separation of the solids from the pulp so as to provide for deposition of the coarser solids first on the filtering medium and thus prevent clogging of the pores of said medium by the finer solids. The fact that gravity is permitted to assist in the segregation of the solids and the deposition thereof on the filter medium also expedites the filtration and permits of formation of a better cake by reason of the coarse solids settling against the filtering medium and the fine solids settling over the coarse solids. The capacity of a given size of filter is thus increased beyond that heretofore obtainable. The filter cake thus obtained also permits thorough and uniform washing and drying, thus providing the maximum separation between solids and liquids. Another advantage of this mode of operation, in which the liquid is supplied above the filtering medium, is that no agitation is required for holding the solids in suspension so as to bring them in contact with the filtering medium, as in my invention the natural tendency of the solids to settle is utilized to assist the vacuum in building up a cake comprising the solids, and particularly to assist in the deposition of such solids according to size so as to provide the most advantageous filtration conditions.

Another object of the invention is to facilitate the removal of the cake and solids from the filtering medium by providing for bringing the filtering medium, at the time of removal of solids therefrom, to a position in which the layer of solids is below said medium and can fall freely therefrom, and by providing for changing the curvature of the filtering medium at the time of removal of solids by application of fluid pressure thereto, so as to loosen the material from said medium.

Another object is to provide for rapid vibration or pulsation of the filtering medium at the time of cake discharge by alternately applying fluid pressure and vacuum thereto, so as to thoroughly loosen and dislodge the cake therefrom and restore the filtering medium to the cleanest possible condition before it re-enters the pulp. This feature of my invention while of especial advantage in connection with my improved type of interior filter, may also be applied with advantage in connection with other types of filter, such as the ordinary continuous vacuum or rotary filters now in use.

Another object of my invention is to provide for very effective and complete drainage or removal of the liquid from the filter panels or cells after such liquid has passed through the filtering medium, so as to thoroughly dry the cake of solids. This provides for a complete and sharp separation between the solids and the liquid, and permits thorough washing of the solids. It also prevents the solids from falling off the filtering medium after it leaves the pulp and before the time of discharge, as is apt to occur if the liquid is not completely removed from the filter panel.

Another object is to provide practical means for removing or conveying the solids from the filter after such solids are discharged from the filter medium, and to provide advantageous means for supporting such conveying means within the filter.

Other objects and advantages of my invention will appear hereinafter.

The accompanying drawings illustrate embodiments of my invention and referring thereto:

Figure 1:
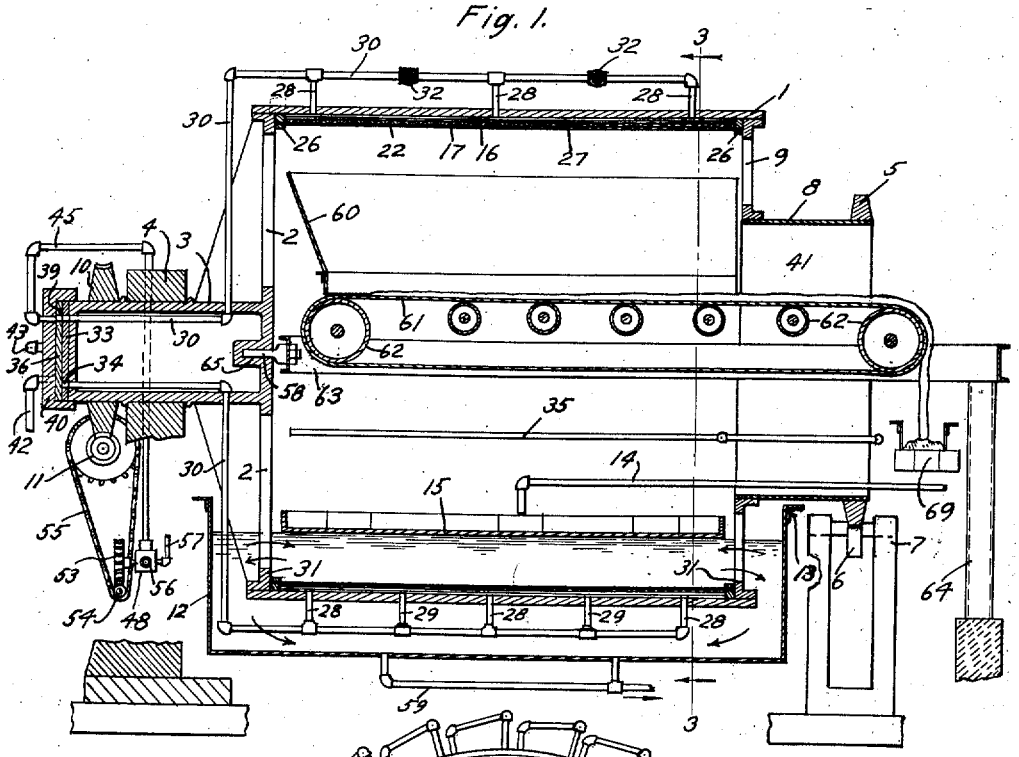
Fig. 1 is a longitudinal vertical section of one form of the filter.
Figure 2:
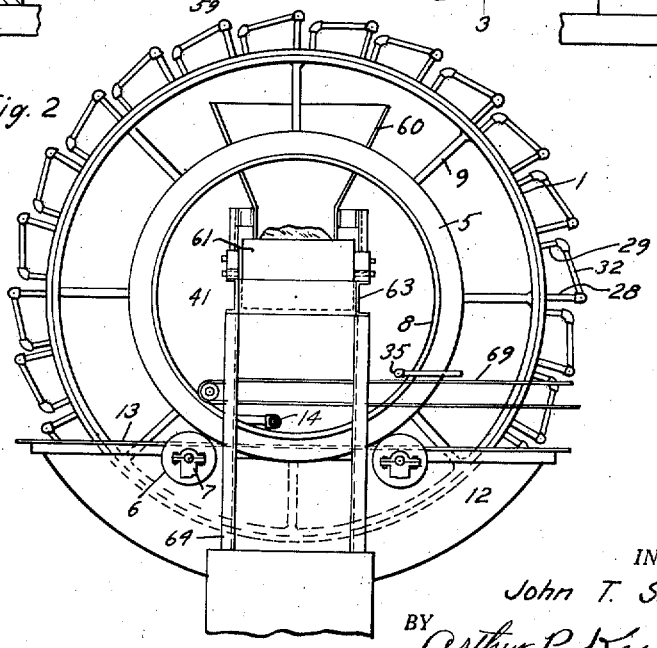
Fig. 2 is an end view of the filter shown in Fig. 1.
Figure 3:
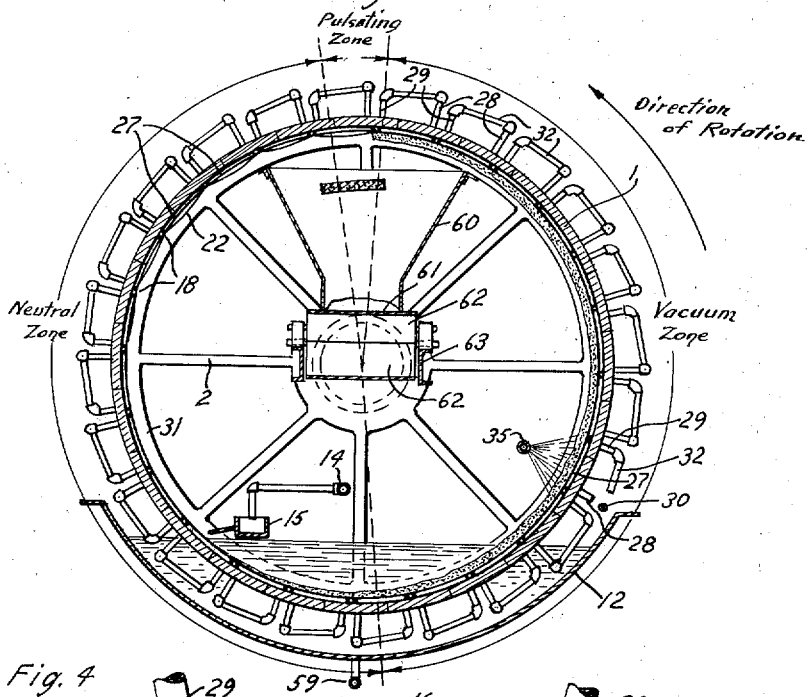
Fig. 3 is a section on line 3—3 Fig. 1.

The form of my invention shown in Figs. 1 to 3 comprises a rotary drum or shell 1 which may be of any suitable shape but is preferably formed as a cylindric casing formed of wooden staves suitably bound together or of sheet metal or of other suitable construction. Said drum may be open at both ends and may be provided at one end with a spider 2 which is mounted or carried on a hollow shaft or trunnion 3 supported and journaled in suitable bearing means 4. The other end of the rotary filter drum may be supported by means of riding ring 5 running on carrying rolls 6 which are journaled in suitable bearing means 7, said ring being connected to the filter drum in any suitable manner for example by means of the contracted cylindrical portion 8 and spider 9. By supporting this end of the carrier member in this manner a central opening 41 is provided, through which may lead means for supplying pulp and washing liquid to the interior of the carrier and means for removing discharged solids therefrom. Means are provided for driving the drum to slowly rotate the same, said means consisting for example of a worm wheel 10 on shaft 3 and a worm 11 engaging said worm wheel and driven by any suitable means.

Suitable pulp receiving or containing means are provided surrounding the lower part of the filter drum so as to maintain a body of pulp in contact with the filter drum at the lower portion of its path, said pulp receiving or containing means comprising for example tank 12 whose end wall 13 passes under the contracted cylindrical or neck portion 8 of the filter. The casing 1 may be provided at its ends with inwardly projecting flanges 31 but such flanges are not of sufficient height to interfere with free circulation of pulp between the interior of the filter and tank 12 nor to cause the filter itself to serve as a pulp container, but are only of the approximate height of the cake of solids to be deposited. Such flanges may, if desired, be entirely omitted. Instead of being open at both ends to permit circulation of pulp, the carrier member of drum 1 may in some cases be open only at one end below the level of the pulp. Any suitable means may be provided for supplying the liquid to be filtered to the tank 12 but I prefer supplying such liquid or pulp at a point within the filter drum so as to deliver the pulp first onto the filter drum while permitting the container 12 to receive any overflow therefrom and prevent loss of pulp. The pulp feed means may comprise for example, pipe 14 extending into the drum through the central opening 41 within the contracted neck portion 8 and discharging into the lower portion of the drum, preferably by means of launder 15 so as to provide for distribution of the pulp and prevent excessive agitation of the solids or pulp directly beneath the discharge end of said supply means 14. Suitable means such as pipe 59 may be connected to the bottom of tank 12 and to suitable means for causing a certain desired portion of the pulp to be continually withdrawn from said tank and returned to the main supply pipe 14 so as to maintain circulation within said tank and prevent accumulation of solids at the bottom thereof.

Figure 4:
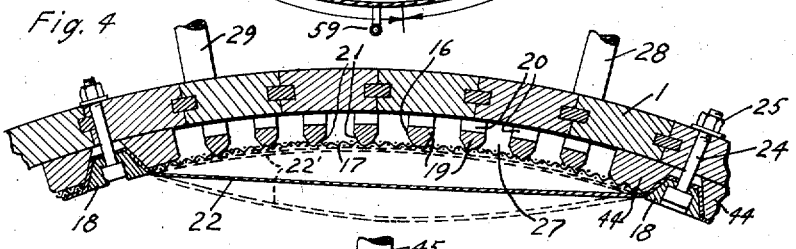
Fig. 4 is a sectional view of a portion of the peripheral wall of the filter drum showing one means for attaching the filtering medium thereto.
Figure 5:
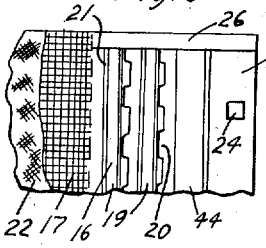
Fig. 5 is an inverted plan view of some of the parts shown in Fig. 4 with portions of the filtering medium and supporting screen broken away.

The impervious wall of the filter drum 1 is provided on the inside thereof with means forming filter cells or panels. For this purpose I may mount a previous filtering medium 22 within said wall and provide suitable supporting frame or grid means 16, supporting screens 17, and retaining means 18; said retaining means may be arranged at intervals around the interior of the filter drum for retaining said filtering medium in position within the supporting screens 17 and separating the panels from one another as indicated in Fig. 4. The supporting frame or grid means 16 for each filter panel may comprise wooden strips 19 extending longitudinally of the filter drum and slotted or undercut adjacent the wall of the filter drum as indicated at 20 to provide for passage of liquid, and thus permit free flow of liquid between all parts of the panel. Said strips may advantageously be bevelled at their outer corners as at 21 so as to provide the maximum free space for flow of liquid through the filter medium and through supporting screen 17. Any other suitable form of supporting grid may be used for supporting the screens 17 and filter members 22. The filter medium indicated at 22 may consist of any suitable pervious material and preferably comprises a flexible material such as canvas or other pervious fabric which is stretched so as to extend around the interior of the filter drum inside the suitable intervals by retaining means 18 aforesaid. Said retaining means may consist of longitudinal strips or wedges fitting within grooves in the wall of the filter drum, which may be formed, as shown, between strips 44 secured to said drum, and said retaining means are provided with tightening bolts and nuts 24 and 25. The filtering medium may be placed in position by taking a long strip of the canvas or other material to be used and inserting one end thereof under one of the wedges 18 and fastening the same in position by means of tightening means 24 and 25. The canvas is then stretched, while wetted if desired, across to the next adjacent retaining wedge 18, caught under said wedge which is then tightened to stretch the cloth tightly in position, and this operation is continued until the filter medium has been placed in position entirely around the drum. By means of wedges 18 and tightening means 24 and 25 any desired tension may be given to the filtering medium, so as to keep the meshes or openings thereof in as porous a condition as possible. The supporting means 16 screen 17, and filter medium 22 between any two adjacent retaining means 18 constitute or define a filter panel 27. It will be understood that the purpose of the screen 17 is to provide a suitable support for the filter medium when it is pressed outwardly by the action of the suction or vacuum as hereinafter described and for this purpose the said screen is preferably formed so as to be concentric with or parallel to the wall of rotary filter drum 1 and to present the minimum resistance to liquid flow consistent with effective support of the filter medium. Screens 17 and filter medium 22 may be secured in any suitable manner at their ends to supporting or retaining strips 26 which extend around and are secured to the inside of drum 1.

Suitable means are provided for applying vacuum and fluid pressure to the filter panels 27 above mentioned, and for removing liquid from said panels, said means comprising for example pipes passing through the peripheral wall of the filter drum and communicating with the space within each panel; and in order to provide effective drainage and removal of liquid from said panels I prefer to provide a plurality of draining pipes 28 communicating with each panel adjacent the rearward portion thereof relative to the direction of rotation of the filter drum and a plurality of leading pipes 29 communicating with the forward portion of the panel. Any desired number of the pipes 28 and 29 may be provided, said pipes being distributed at suitable intervals throughout the length of the filter drum so as to provide for maintaining uniform conditions of vacuum or pressure within the panels and uniform drainage of liquid therefrom. For example, as shown, I may provide three of the pipes 28 connected at the rear of each panel and two of the pipes connected at the forward portion thereof. It will be seen from Fig. 3 that such an arrangement provides for very effective and complete removal of liquid from the filter panels, for as each panel rises out of the pulp the pipes 28 and 29 are below said panel so as to permit all of said liquid to drain by gravity, assisted by the action of the vacuum, into said pipes. Pipes 28 and 29 may be connected by means of header pipes 30 to suitable valve means for controlling the admission of vacuum and pressure thereto.

In order to provide complete drainage of liquid I prefer to connect each header pipe 30 directly to the outer end of the corresponding pipes 28 as shown in Fig. 3 and to connect said header pipe to pipes 29 by means of connecting pipes 32, so that as each panel rises out of the pulp, the header pipe 30 is at the lowermost point in the drainage system of that panel.

Figure 6:
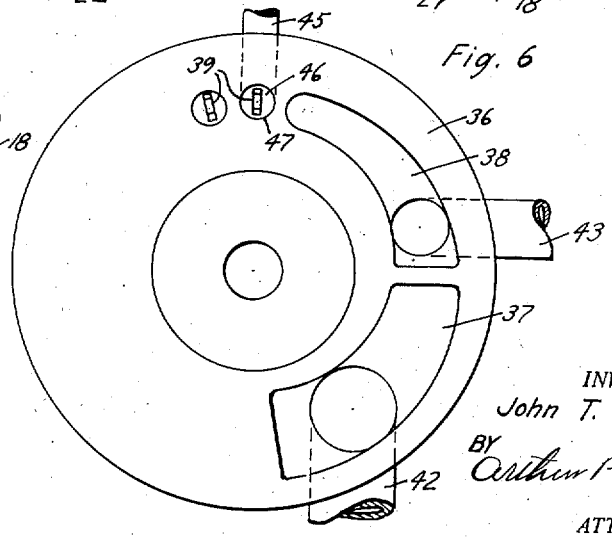
Figs. 6 and 7 are detailed views of parts of the main vacuum and pressure control valve means.
Figure 7:
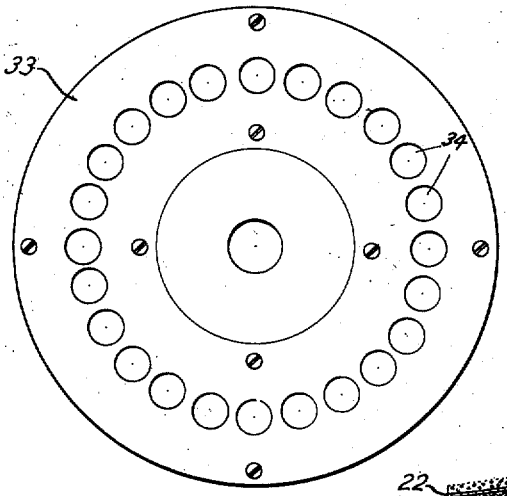

The valve means above referred to for controlling admission of vacuum and fluid pressure to the filter panels may be of any suitable type adapted to connect each pipe 30 throughout a portion of the revolution of the filter to vacuum means and to connect such pipe at another portion of the revolution of the filter to pressure means or preferably to pulsating pressure or alternating pressure and vacuum means for dislodging the cake from the filter medium. For example as shown in Figs. 1, 6, and 7 said valve means may comprise a valve plate 33 mounted at the outer end of trunnion 3 so as to rotate therewith and provided with a plurality of ports 34 corresponding to the respective pipes 30 and to which such pipes are connected, and a fixed valve plate 36 provided with vacuum ports 37 and 38 and one or more pressure ports 39 adapted to register with the ports 34 in the other valve plate. Said valve plates 33 and 36 are adapted to fit snugly against one another so as to prevent leakage of pressure or vacuum while permitting relative rotation thereof. Valve plate 36 may be held in position by cover plate 40 which may be supported in any suitable manner so as to hold said valve plates in engagement with one another. Vacuum supply means 42 and 43 are connected to vacuum ports 37 and 38, and said vacuum supply means may be connected to any suitable source of vacuum, and provided with the usual means employed in connection with vacuum filtration apparatus for separation of liquid and air withdrawn from the filter while maintaining a vacuum therein.

The provision of separate vacuum supply means 42 and 43 may not be necessary in all cases but I prefer to provide two such means, one for operation during the time of actual filtration and removal of liquid from the filter panels, called the "wet vacuum" supply means and provided with above-mentioned means for separation of liquid and air, and the other for maintaining a vacuum on the cake after removal from the pulp and drying the same, called the "dry vacuum" supply. Any desired number of separate vacuum supply means may however be provided, for example one such means may be provided for withdrawing the main filtered liquid and another for withdrawing a wash liquid from the filter cake if such is used, and said vacuum supply means may be in any case connected to ports similar to the ports 37 and 38, so positioned with respect to ports 34 as to bring each vacuum supply means in communication with pipes 30 during the desired portion of the revolution of the filter. Such wash liquid, for example water, may be supplied in the form of a fine spray as is customary in continuous vacuum filtration, by means of perforated pipe 35 so positioned as to spray such wash liquid onto the cake at any desired point after leaving the pulp. One or more of the pressure ports 39 may be provided with a connection 45 for supplying fluid pressure or alternating pressure and vacuum thereto, the number of such ports so connected depending upon the length of the zone of travel of the filter medium through which it is desired to apply such pressure or alternating pressure and vacuum for dislodging the cake of solids from the filtering medium. In order to more sharply define the zone of such pressure application the ports 39 are preferably formed as narrow slots in plugs 46 which may be screwed into round openings 47 in the valve plate 36. The connecting pipe or pipes 45 may if desired be connected directly to a source of fluid pressure of any desired magnitude, but I prefer to connect such pipe or pipes 45 as indicated to a three-way valve 48.

Figure 8:
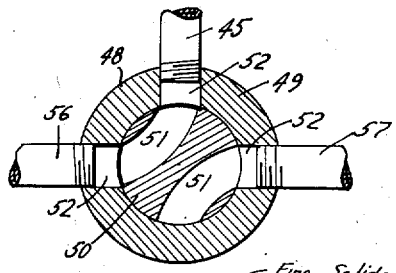
Fig. 8 is a detailed section of a three-way valve which may be used for producing pulsating pressure.

Said three way valve as shown in Fig. 8 may comprise a casing 49 and rotary valve member 50 provided with ports 51 adapted to register with openings 52 in said casing. Rotary valve member 50 may be driven in any suitable manner for example by means of worm wheel 53 and worm 54 which may be driven by means of chain 55 from the shaft of the main worm 11. The relation between the speed of rotation of rotary valve member 50 and the speed of revolution of the filter may thus be made such as to give any desired number of rotations of the valve during the time in which each filter panel 27 is placed in communication with the pulsating pressure supply pipe 45. Said pipe 45 may be connected to the intermediate opening 52, of the three way valve and the other openings 52 of said valve may be connected by means of pipes 56 and 57 to a source of fluid pressure for example, air or steam under pressure, and to a source of vacuum respectively. The operation of valve 48 thus causes pressure and vacuum to be alternately applied to the filter panel which is at any time in communication with pipe 45 and thus causes the filter medium to be alternately inflated and deflated with any desired rapidity.

The employment of a concave screen 17 against which the filter 22 is normally held by the suction permits the filter member to be flexed between concave and convex position during discharge of the cake. This arrangement avoids the stretching of material which occurs when filter cloth is forced outwardly from a flat backing into convex position during cake discharge, since the cloth must be under some tension when in flat position in order to filter effectively, as is well known.

The concave screen 17 can be designed so that the filter member 22 is under substantially the same tension when it lies against the screen as it will be when in outwardly flexed position. Furthermore, when held in the concave position by suction the filtering surface is relatively compressed and the filtrate surface relatively expanded, tending to prevent fine solids from passing the former and facilitating their passage through the filter if they do enter the cloth. Correspondingly, the filtering surface is expanded when the cloth is blown into convex position, which more effectively loosens the particles which may have found their way a short distance beneath the surface and permits more ready clearance of these particles from the cloth, it being well recognized that removing this type of obstruction is one of the most difficult problems in keeping filter cloth free from blinding.

Figure 10:
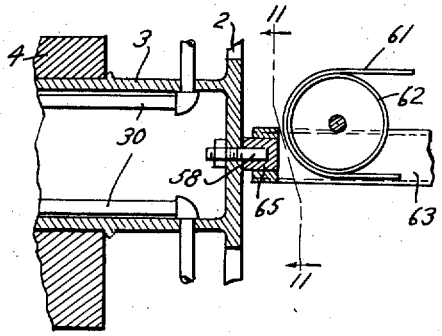
Fig. 10 is a partial sectional view showing a modified means of supporting the conveying means within the filter.
Figure 11:
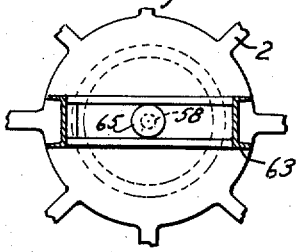
Fig. 11 is a section on line 11—11 in Fig. 10.
Figure 12:
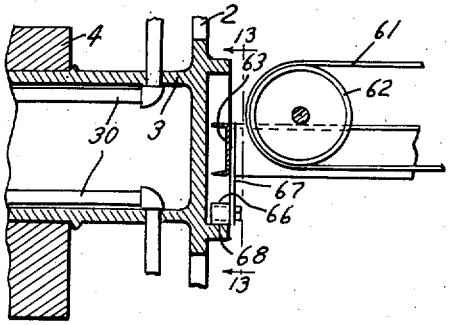
Fig. 12 is a view similar to Fig. 10 showing another modification of the conveyor supporting means.
Figure 13:
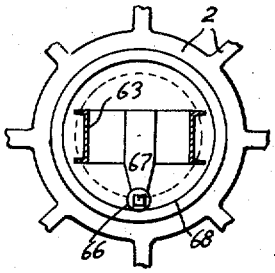
Fig. 13 is a section on line 13—13 in Fig. 12.

Suitable means are provided for receiving the solid material dislodged from the filter medium and for removing such solid material from the filter. Such means may comprise for example hopper 60 supported in suitable manner within the filter at a position below the portion of the filter shell at which the removal of the filter cake from the filter medium is to be effected, and belt conveyer 61 below said hopper and adapted to convey the material falling through said hopper out through the central opening 41 within the neck portion 8 of the filter. Belt conveyer 61 may be mounted on rollers 62 and may be driven in any suitable manner, and said rollers and the conveyor carried thereby, as well as hopper 60 may be supported on suitable supporting frame means 63. Said frame means 63 may extend through the central opening within the neck portion 8 at one end of the filter, and may be supported outside the filter at this end as at 64, and may be supported within the filter at the other end, for example, by means of a pin 58 secured to the end of said frame and extending along the axis of carrier 1, engaging in a bearing or recess 65 at the inner end of trunnion 3. Or if desired the pin 58 may be mounted on the filter trunnion and bearing 65 on the conveyer supporting frame as indicated in Figs. 10 and 11. Another modified form of supporting means for the conveyer and hopper is shown in Figs. 12 and 13, in which a roller 66 is mounted at the end of the conveyer frame by means of plate 67, said roller riding on a track 68 formed on the filter trunnion. Any of the above described supporting means provide an effective method of supporting the inner end of the conveying means and the hopper within the filter. Other conveying means 69 may be provided for receiving the material from conveyer 61 and conducting the same to any desired point.

Figure 9:
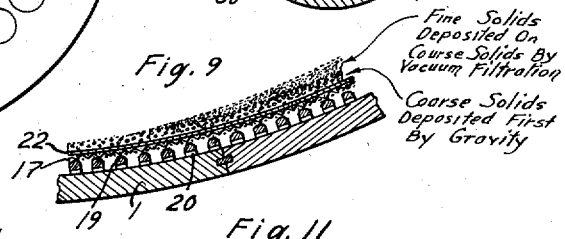
Fig. 9 is a partial sectional view showing the method of formation of the cake of solids on the filter medium.

The apparatus above described may be used in any filtration operation, for example it may be advantageously employed in the filtration of metallurgical pulp. The operation of the apparatus in the filtration of such pulp is as follows: The filter is set in slow rotation in the direction indicated by the arrow in Fig. 3 and the vacuum and pressure supplying apparatus put in operation. The pulp, usually after removal of a large portion of the water by means of thickeners, and containing for example from 5% to 85% solids of varying sizes, is delivered to the interior of the filter through supply means 14, such pulp being either pumped through said supply means or permitted to flow therethrough by gravity. Such pulp is distributed by means of launder 15 and it should be noted that the position of said launder is such that the pulp is delivered close to the filter medium adjacent the point at which said filter medium enters the body of pulp while the vacuum is not applied until the filter medium has passed part of the way through the body of pulp so that the coarser solids of the pulp are permitted to settle first onto the filter medium by the action of gravity. The pulp so delivered into the interior of the filter is not actually contained or held in place by the filter or carrier itself but is free to circulate out into the tank 12 beyond the ends of the filter and back into the filter again, such circulation serving to accommodate fluctuations in supply of material or fluctuations in the rate of filtration. When the rate of supply of material is gaining on the rate of filtration more of the pulp will flow out into the tank and when on the other hand the rate of filtration gains on the supply such pulp will flow back into the filter. When return means 59 are provided for continually withdrawing a portion of the pulp from the bottom of the tank and returning the same to the supply pipe there will of course be at all times a slight flow of pulp toward the bottom of the tank, such flow serving to prevent accumulation of solids in the bottom of the tank. Each filter cell or panel 27 in passing through the pulp receives first a coating of the coarser solid particles of the pulp, deposited thereon by gravity, since the vacuum is not applied until a considerable time after such panel has entered the pulp. Upon reaching the point of application of the vacuum, which point may for example be at or near or preferably somewhat beyond the lowest point in the revolution of the filter, as indicated in Fig. 3, the port 34 corresponding to such panel registers with the vacuum port 37 and the vacuum filtration begins. Under the action of the vacuum, liquid is drawn through the filter medium and removed from the panel, while a layer of finer solids from the pulp is gradually built up on top of the coarse solids as indicated in Fig. 9. The formation of a layer of coarse solids next to the filter medium is of very great advantage as it prevents clogging of the pores thereof and thus permits a very rapid rate of flow of the liquid through the filter medium to be maintained.

The vacuum connection is maintained after the filter panel passes out of the pulp so as to completely remove free liquid from the pulp and from the interior of the panel. It is a particular advantage of my invention that at the time of removal of such liquid from the panel, the drainage system for such panel is in the most advantageous position to effect complete removal of liquid from the panel due to the fact that draining pipes 28 and header pipe 30 are below the lowermost portion of the panel and all the liquid from such panel is therefore permitted to drain into such pipes by gravity as well as by the action of the vacuum. This is due to the fact that the drainage system is connected to each panel from outside the periphery of the drum, and that the pipes 28 are distributed along the rear edge of the panel. In case a washing liquid is to be used for treating the removed solids the same may be supplied through means 35 at a point somewhat after the solids have passed out of the pulp. The vacuum connection is maintained during the washing operation due to the arrangement of the valve ports, and the wash liquid withdrawn from the panel through pipe 30 and may either be removed together with the filtered liquid, or removed separately therefrom by providing separate vacuum ports as above described. At a suitable point in the revolution of the filter, for example at about the level of the horizontal axis thereof connection to the "wet vacuum" line may be cut off and connection established to the "dry vacuum" line as above described, so as to draw air through the cake of solids and dry the same. The point at which this change in connection is effected is determined by the position of ports 37 and 38, and may be so regulated as to occur at about the completion of the removal of free water from the cake.

As each panel reaches a point above hopper 60 the vacuum is cut off, due to port 34 passing out of registry with port 38, and alternating pressure and vacuum are then applied to the filter panel upon said port 34 coming into position to register with the port 39. Such alternating pressure and vacuum are controlled by the three-way valve 48 above described and the speed of operation of such three-way valve may be such as to provide any desired number of alternate applications of pressure and vacuum during the time when said ports are in communication. I have found for example that good results may be obtained by providing from two to five alternate pressure and vacuum periods while the panel is passing over the hopper. The filtering medium is thus alternately flexed inward and outward from its normal position as indicated at 22 in Fig. 4 due to the pulsating fluid pressure applied to the panel, and the resulting pulsations or vibrations of the filtering medium cause the cake of solids to be loosened or dislodged therefrom and to fall by gravity into hopper 60 and onto conveyer 61 for removal from the filter. The filter medium is thus subjected to a beating action which serves to very effectively clean the pores or openings thereof. The filter cake being in the form of an arch, the location of the pipes 28 and 29 above and near the ends of this arch makes for the further advantage that these portions of the cake receive the direct force of the pressure pulsation which tends initially to destroy the foundations or springers of the arch shaped cake rendering it more readily dislodged from the filtering medium. The fact that the layer of coarse solids is produced next to the filter medium assists very materially in the separation of the solids from the filter medium and leaves the openings of such filter medium free from solids and in the most advantageous condition for beginning a fresh filtration cycle. Other means may be provided if desired for effecting the separation of the cake of solids from the filter medium or for assisting in such operation, such means comprising for example a scraper or a stripping roll located above the hopper in position to engage the cake of solids. In general, however, when using alternating pressure and vacuum for effecting cake discharge, and when the coarser solids are deposited next to the filtering medium as above described, no such auxiliary cake removing means are necessary.

Figure 14:
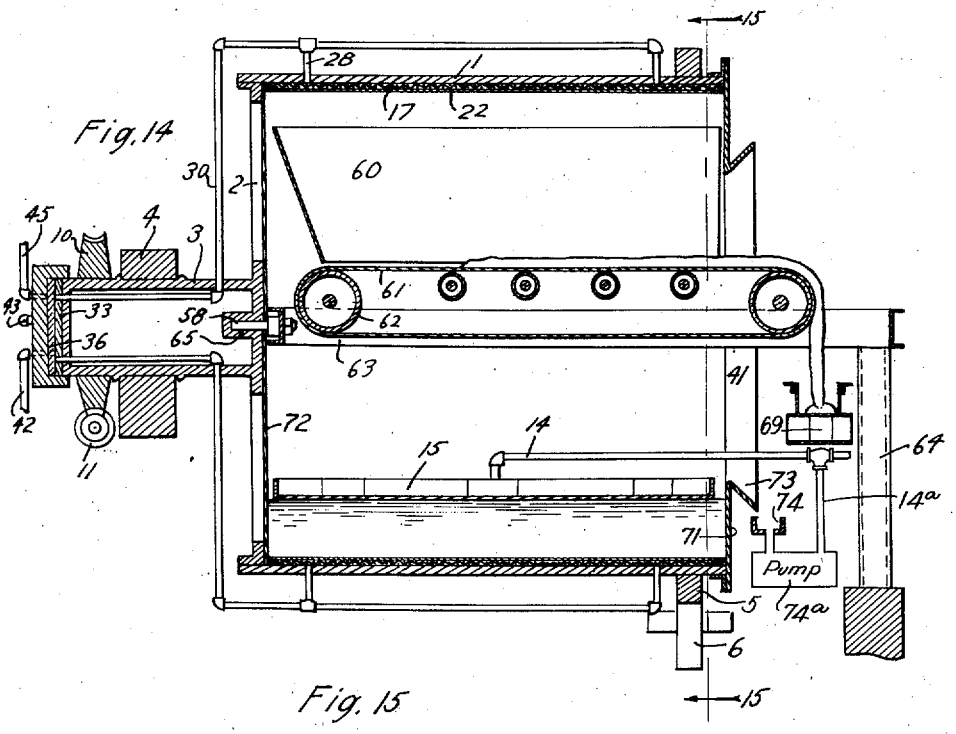
Fig. 14 is a longitudinal vertical section of a slightly modified type of filter embodying my invention.
Figure 15:
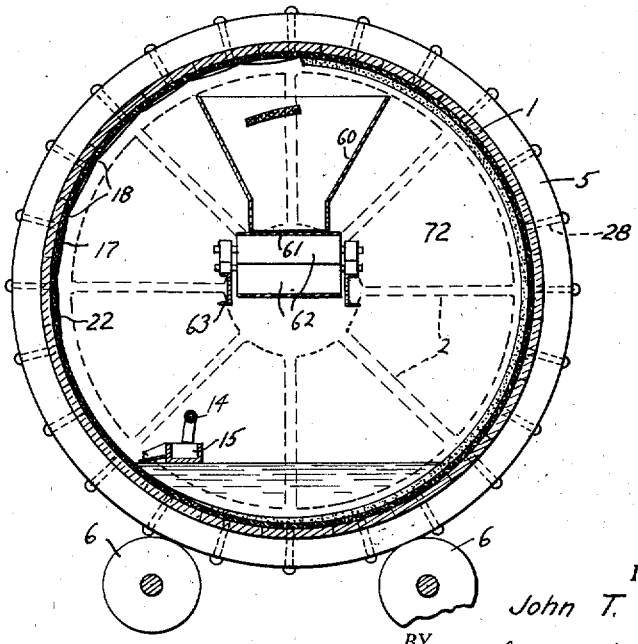
Fig. 15 is a section on line 15—15 in Fig. 14.

Various modifications may be made in the apparatus above described; for example as shown in Figs. 14 and 15 the rotary drum or carrier 1 may itself constitute the container for the pulp. In this case the carrier may be mounted as before by means of spider 2 and hollow trunnion 3 journaled in bearing 4 at one end and by means of riding ring 5 and carrier wheels 6 adjacent the other end. The drum 1 is provided, as before, with central opening 41 at said other end, and is provided at this end with an inwardly extending flange 71 of sufficient height to maintain a body of pulp within the filler. The other end of the filter shell may be closed as at 72, and flange 71 and wall 72, together with the peripheral wall of the filter, form a tank or receptacle at the lower part of the drum or carrier for receiving the pulp or material to be filtered. Flange 71 may if desired be provided with an overflow cone or spillway 73 over which any excess of material supplied may pass to a suitable launder 74. This form of my invention may, as indicated, be in other respects substantially the same as that above described, being provided with means for driving the same, means for supplying pulp thereto, means for applying vacuum and pressure to the filter panels and means for removing solids from the filter.

The operation of this form of my invention is substantially the same as that above described, the pulp being supplied to the interior of the filter by feed means 14 and launder 15, said pulp being however retained within the filter drum itself in the case. Any excess in supply beyond the capacity of the filter overflows through spillway 73 and may be returned to the supply line 14 in any desired manner for instance through line 14*a* from pump 74*a* into which launder 74 discharges. The filtering, washing, and drying operations may take place substantially as above described.

Figure 16:
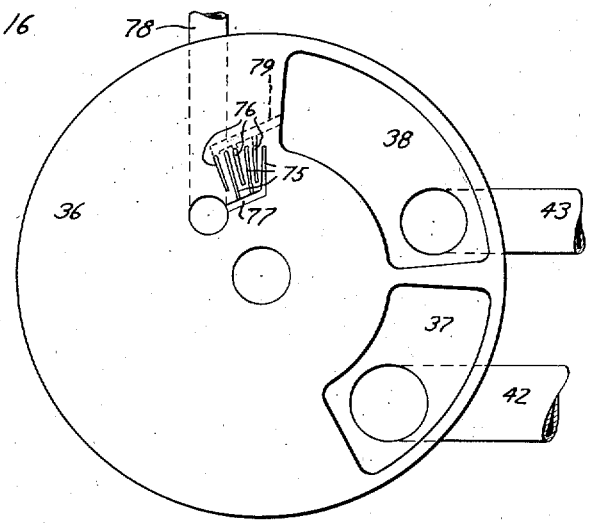
Figs. 16 and 17 are detailed views of another form of control valve means.
Figure 17:
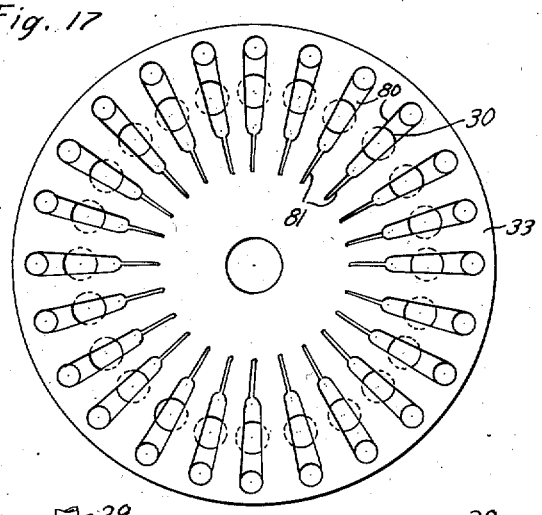

In Figs. 16 and 17 is shown another type of valve for controlling the admission of vacuum and pressure to the panels, it being understood that either type of valve may be used in connection with either of the types of filter above described. The valve plate 36 is provided in this case as before with vacuum ports 37 and 38 to which vacuum supply pipes 42 and 43 may be connected as above described. Instead of providing an auxiliary three-way valve for applying pulsating pressure or alternate pressure and vacuum to the filter however a plurality of relatively narrow alternating ports 75 and 76 may be provided in valve plate 36, the ports 75 being connected by means of passage 77 and pipe 78 to a source of pressure, and ports 76 being connected to a source of vacuum in any suitable maner for example by means of an internal passage 79 communicating with the "dry vacuum" port 38. The other valve plate 33 to which the pipes 30 are connected may in this case be provided with ports 80 each of which is connected to a pipe 30 and is adapted to register both with ports 37 and 38. Said ports may also have relatively narrow portions 81 extending inwardly therefrom so as to register with ports 75 and 76. In the operation of this form of valve, the control of the vacuum connections is the same as above described. The pulsating pressure for dicharging the filter cake, however, is provided by the portions 81 of the respective ports 80 coming into alternate communication with ports 75 and 76.

The pulsations of the filter medium, for effecting discharge of cake therefrom may occur somewhat less rapidly in this case than in the other form, but by making portion 81 of ports 80 sufficiently narrow, and by making ports 75 and 76 sufficiently narrow and close together, a sufficient rapidity of pulsation may be accomplished to give the desired beating action. The filter medium is thus alternately flexed inward and outward as before and the cake is dislodged therefrom and falls into hopper 60.

Figure 18:
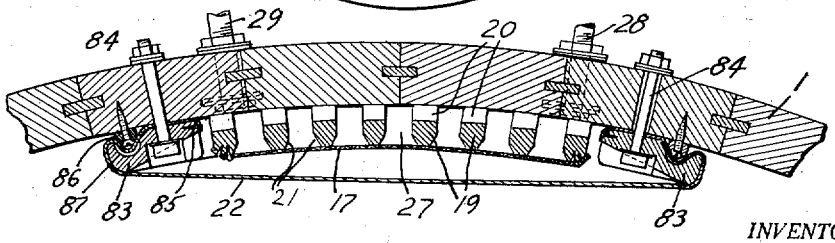
Fig. 18 is a sectional view of a portion of the peripheral wall of the filter drum showing a modified means of attaching the filter medium thereto.

Instead of mounting the filter medium as above described it may be mounted as shown in Fig. 18. In this case a separate strip of filter medium 22 is provided for each panel and said filter medium may be held in place by means of retaining strips 83 at the edges of the panel, said retaining strips being secured to the filter by means of bolts 84. The filter medium may be secured to strips 83 by means of nails 85 and may also be held in position due to clamping between strips 83 and the peripheral wall of the filter. In order to still more securely hold the filter medium in position I may provide strips 86 mounted on the peripheral wall of the filter, which serve to bend or press the filter medium into grooves 87 in strips 83. The construction of the filter panels may be otherwise subtantially as above decribed.

Figure 19:
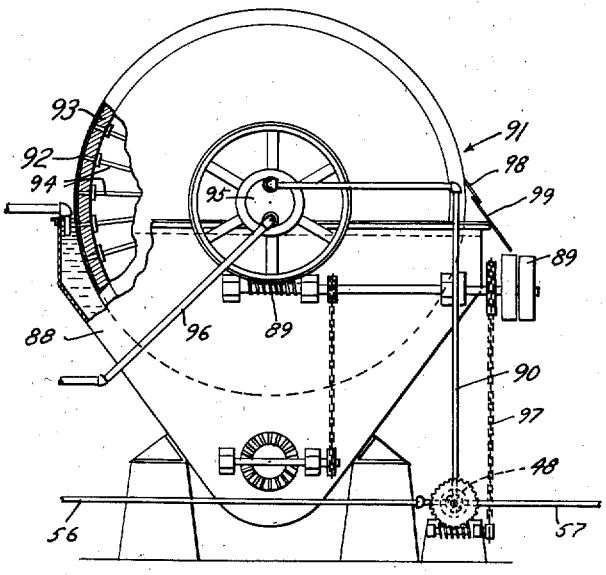
Fig. 19 is an end view of another type of continuous vacuum filter, showing the application thereto of means for producing pulsating pressure according to my invention.

While I have illustrated the rotatably mounted filter carrier as comprising a cylindrical drum it is obvious that any suitable shape of shell or casing may be used for this purpose. For example said carrier may comprise a hexagonal, octagonal, or other similarly shaped shell or casing provided interiorly with a filter medium and being provided with suitable supporting means similar to those above described. In such cases the filtering medium may itself be cylindrical or it may conform to the shape of the shell, there being for example one or more filter cells or panels within each side of the shell. Either of the means above described for producing pulsating pressure, or alternating pressure and vacuum may be applied with many types of either vacuum or pressure filters in addition to those above described. For example, as shown in Fig. 19, the three-way valve 48 for producing alternate pressure and vacuum may be connected to the usual air pressure line 90 of filter 91, which may be of any of the well-known types of continuous vacuum filter in which the filter medium 92 is mounted on the outside of a rotary drum or carrier 93. Said rotary carrier is provided with suitable driving means 89 for slowly rotating the same, and a tank is provided for maintaining a body of liquid around the lower portion of the filter drum. The space inside the filter medium of such filters may be connected to pipes 94, and suitable valve means 95 are provided, by means of which said pipes are placed in communication, at certain parts of their revolution with vacuum pipe 96 and pressure pipe 90, which is in this case adapted to supply alternating pressure and vacuum to the interior of the filter medium. The construction and operation of three-way valve 48 may be substantially the same as above described, pressure pipe 56 and vacuum pipe 57 being connected thereto as before. Said valve may be connected to the operating mechanism of the filter, for example by driving means 97. Scraper 98 may be provided for removing the cake from the filter medium and apron 99 may also be provided, over which the discharged cake may pass to any suitable means for conveying the same away. It is customary with such filter to apply fluid pressure to the interior of the filter medium at or prior to the time of engagement with scraper 98, and the construction of valve means 95 is therefore made such as to apply this pressure to the filter medium at this point. The arrangement and operation is the same in the present case, except that instead of applying steady fluid pressure, alternate pressure and vacuum are applied. This rapidly vibrates or beats the filtering medium and causes the cake to be more thoroughly loosened and dislodged therefrom than when straight pressure is employed.

While I have described the operation of my improved filter in the filtration of metallurgical pulp, it may also be used for various filtering operations, for example, in the filtration of oils, sugar solutions or other liquids commonly filtered in the various industrial operations, or in the separation of solids from liquids in sewage treatment plants, etc. In any case the operation of the device is substantially as above described and the above mentioned advantages are realized.

I claim:

1. Filtering apparatus comprising a rotatable drum, a filtering medium mounted on the inner longitudinal face of the drum arranged to pass beneath a liquid in a zone at the lower part of the drum, and means for applying filtering pressure to the medium when in contact with such liquid but only in a portion of said zone spaced from the point of entrance of the filtering medium beneath the liquid.

2. Filtering apparatus comprising a rotatable drum, a filtering medium mounted on the inner longitudinal face of the drum arranged to pass beneath a liquid in a zone at the lower part of the drum, and means for applying a vacuum to the medium when in contact with such liquid but only in a portion of said zone spaced from the point of entrance of the filtering medium beneath the liquid.

3. Filtering apparatus comprising a rotatable drum, a plurality of separate filtering cells on the inner longitudinal face of the drum arranged to pass successively beneath a liquid in a zone at the lower part of the drum, and means for applying filtering pressure successively to said cells when in contact with the liquid but only in a portion of said zone spaced from the point of entrance of each cell beneath the liquid.

4. Filtering apparatus comprising a drum rotatable about a horizontal axis, a filtering medium mounted on the inner longitudinal fa e of the drum adapted to pass beneath a liquid at the lower part of the drum, and means for applying filtering pressure to the medium when in contact with the liquid but only after the portion of the medium to which pressure is applied has passed beneath the axis of rotation.

5. Filtering apparatus comprising a rotatable drum, a filtering medium mounted on the inner longitudinal face of the drum adapted to pass beneath a liquid at the lower part of the drum, solids dislodging means for alternately applying fluid pressure and vacuum to the filtering medium, and means for synchronizing the action of such solids dislodging means with the rotation of the drum.

6. Filtering apparatus comprising a rotatable drum, means for rotating said drum, a filtering medium mounted on the inner longitudinal face of the drum arranged to pass beneath a liquid at the lower part of the drum, solids dislodging means for alternately applying fluid pressure and vacuum to the filtering medium, and a synchronizing actuating connection between the solids dislodging means and the drum drive.

7. Filtering apparatus comprising a rotatable drum, a filtering medium mounted on the inner longitudinal face of the drum arranged to pass beneath a liquid at the lower part of the drum, solids dislodging means for alternately applying fluid pressure and vacuum to the filtering medium, and common drive means for rotating the drum and actuating the solids dislodging means.

8. A filtering apparatus comprising a drum mounted for rotation about a horizontal axis, a filtering medium on the inner longitudinal face of the drum, said drum having an opening in one end for introducing material, a receptacle for solids discharged from said medium extending into the drum from said end, and rotatably engaging bearing means between said receptacle and the other end of the drum adapted to support the receptacle within the drum.

9. A filtering apparatus as set forth in claim 8, said bearing means comprising a pin mounted on said supporting frame and extending parallel to the axis of the carrier, and a recess on the end of said carrier adapted to receive and form a bearing for said pin.

10. Filtering apparatus comprising a rotatable drum, a plurality of filter cells on the drum extending longitudinally thereof and passing through a body of liquid to be filtered, and a suction line connected to each cell adjacent the portion thereof which emerges last from the body of liquid for withdrawing filtrate from said cell, said line including a pipe extending around the periphery of the filter.

11. Filtering apparatus comprising a rotatable drum, a plurality of filter cells interiorly on the drum extending longitudinally thereof and passing beneath a body of liquid to be filtered, a suction connection to each cell adjacent the portion thereof which emerges last from the body of liquid for withdrawing a filtrate from said cell, and a suction connection with each cell adjacent the portion thereof which emerges first from the body of liquid, said connections extending below said cells when passing beneath the body of the liquid.

12. Filtration apparatus comprising a rotary carrier, a plurality of filter sections thereon operated in succession, a rotary valve member connected to and rotating with said carrier, and having a plurality of openings each communicating with a filter section and having relatively straight margins transverse to the direction of rotation, and a fixed valve plate engaging the rotating plate over said openings and provided with communicating openings also having straight edges transverse to the direction of rotation and substantially parallel to the edges of the openings in the rotating plate when juxtaposed thereto, the openings in the fixed plate being adapted for connection to means for varying fluid pressure.

13. Filtering apparatus comprising a drum rotatable about a horizontal axis, filtering means on the inner longitudinal face of the drum, means for maintaining a body of liquid to be filtered upon said filtering medium in lower part of the drum, and means for feeding such liquid substantially at the line of contact between the surface of said body of liquid and the filtering medium at the descending side of the drum.

14. Filtering apparatus comprising a drum rotatable about a horizontal axis, filtering means on the inner longitudinal face of the drum, means for maintaining a body of liquid to be filtered in contact with the filtering medium in the lower part of the drum, provided with an outlet for excess feed to said body of liquid; and means for returning said excess to said body.

15. Filtering apparatus comprising a drum mounted for rotation about a horizontal axis and having an opening in one end for introducing material into the drum, a filtering medium on the inner longitudinal face of the drum arranged to pass beneath a liquid at the lower part of the drum, and means extending within the drum and supported thereby for collecting solids discharged from said filtering medium.

In testimony whereof I have affixed my signature to this specification.

JOHN T. SHIMMIN.